United States Patent [19]

Leslie

[11] Patent Number: 5,717,887
[45] Date of Patent: Feb. 10, 1998

[54] SYSTEM FOR THE AUTOMATIC SUBSTITUTION OF CONTROL FIRMWARE EMBEDDED IN A REMOVABLE DISK DRIVE

[75] Inventor: James B. M. Leslie, Kinross, United Kingdom

[73] Assignee: Nomai SA, Avranches Cedex, France

[21] Appl. No.: 509,026

[22] Filed: Jul. 28, 1995

[51] Int. Cl.$^6$ .............................. G06F 12/00; G06F 13/00
[52] U.S. Cl. .......................... 395/439; 395/712; 395/430; 395/489; 395/445
[58] Field of Search ........................ 395/439, 712, 395/438, 430, 445, 489

[56] References Cited

U.S. PATENT DOCUMENTS

| | | | |
|---|---|---|---|
| 4,910,666 | 3/1990 | Nibby, Jr. et al. | 395/182.19 |
| 5,313,585 | 5/1994 | Jeffries et al. | 395/439 |
| 5,465,343 | 11/1995 | Henson et al. | 395/439 |
| 5,537,281 | 7/1996 | Ma et al. | 360/133 |
| 5,596,738 | 1/1997 | Pope | 395/430 |

*Primary Examiner*—Matthew M. Kim
*Assistant Examiner*—Reginald G. Bragdon
*Attorney, Agent, or Firm*—Thomas E. Schatzel; Law Offices Of Thomas E. Schatzel A Prof. Corporation

[57] ABSTRACT

A host computer is connected with a computer interface to a disk drive that accepts removable disk drive cartridges. A FLASH memory provides the non-volatile storage of a default embedded control program and an alternative control program for a processor. A special maintenance track on the removable cartridge is accessible by the processor and an alternative program can be uploaded from it and stored in the FLASH memory if a user interlock and the function and revision codes included in the system permit the upload. A fail-safe switch to the embedded default control program is made when problems are experienced with any uploaded program.

5 Claims, 3 Drawing Sheets

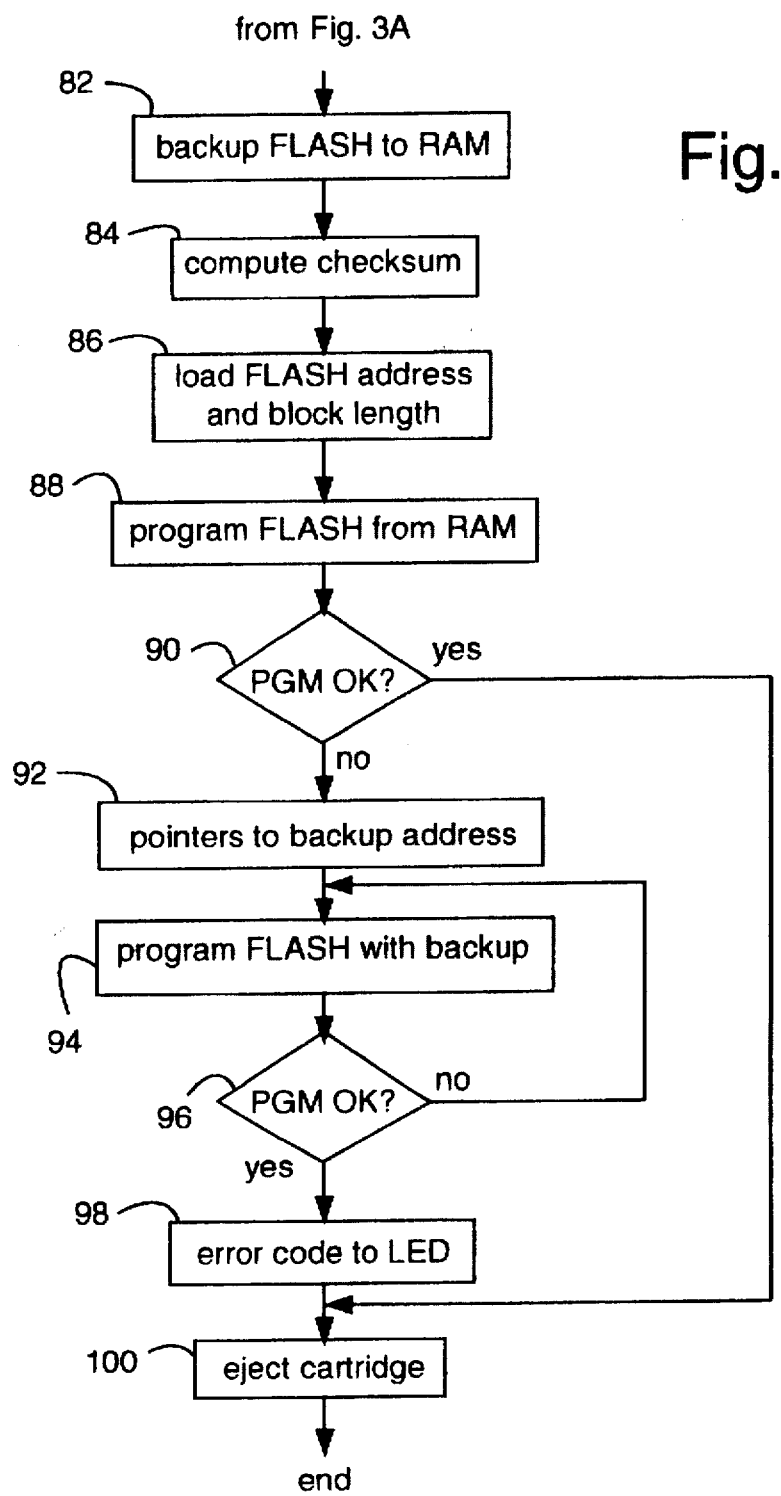

5,717,887

SYSTEM FOR THE AUTOMATIC SUBSTITUTION OF CONTROL FIRMWARE EMBEDDED IN A REMOVABLE DISK DRIVE

BACKGROUND OF THE INVENTION

1. Field of the Invention

The invention relates generally to computer memory and more specifically to removable disk cartridges and disk drives.

2. Description of the Prior Art

The tower, desk-top, portable and notebook personal computers marketed by Packard-Bell, Compaq, AST, IBM, and Apple typically provide internal and/or external connections for 5.25", 3.5" and personal computer modular connection interface association (PCMCIA) type disk drives. Such systems usually come equipped with a 3.5" micro-floppy drive and an internal hard disk. The IBM-compatibles typically use the enhanced device interface (IDE) and Apple Macintosh computers use the small computer system control interface (SCSI). Special SCSI interface boards and modules are available to connect the IBM-compatible computers to SCSI-type drives.

The disk storage that comes with a computer never seems to be enough. So a large and active after-market has developed that provides add-on and add-in hard disk drives, compact disk (CD) drives and removable hard disk drives such as Syquest, IOMega and Floptical disk types.

Both the computers and their memory storage drives are general-purpose devices that have been optimized to give good performance to the majority of users and applications. Disk drives, in particular represent a fine balance between fast data access, data storage density, resilience to temperature extremes, and continuous and uninterrupted sequential access, etc. But of course, such compromises do not suit every application best.

SUMMARY OF THE PRESENT INVENTION

It is therefore an object of the present invention to provide a disk memory subsystem with flexible embedded control programming.

It is a second object of the present invention to provide a disk cartridge that provides an alternative embedded control program for uploading by a compatible disk drive that has a default embedded control program.

It is another object of the present invention to provide a disk drive with a default embedded control program that can upload an alternative embedded control program from a compatible hard disk cartridge.

It is a further object of the present invention to provide a user interlock to manage any uploading of an alternative embedded control program from a disk cartridge to a compatible disk drive with a default embedded control program.

Briefly, a system embodiment of the present invention comprises a host computer connected with a SCSI or another interface to a disk drive that accepts removable disk cartridges. A FLASH memory or similar re-writable semiconductor memory provides the non-volatile storage of a default embedded control program and an alternative control program for a processor. A special maintenance track on the removable cartridge is accessible by the processor and an alternative program can be uploaded from it and stored in the FLASH memory if a user interlock and the function and revision codes included in the system permit the upload. A fail-safe switch to the embedded default control program is made when problems are experienced with any uploaded program.

It is an advantage of the present invention that a disk memory subsystem is provided with flexible embedded control programming.

It is a second advantage of the present invention that a disk cartridge is provided with an alternative embedded control program for uploading by a compatible disk drive that has a default embedded control program.

It is another advantage of the present invention that a disk drive is provided with a default embedded control program that can upload an alternative embedded control program from a compatible disk cartridge.

It is a further advantage of the present invention that a user interlock is provided to manage any uploading of an alternative embedded control program from a disk cartridge to a compatible disk drive with a default embedded control program.

These and other objects and advantages of the present invention will no doubt become obvious to those of ordinary skill in the art after having read the following detailed description of the preferred embodiment which is illustrated in the drawing figures.

IN THE DRAWINGS

FIG. 3B is a flow chart of a control program included in the disk drive of FIG. 1 to program a FLASH memory included in the disk drive of FIG. 1.

DETAILED DESCRIPTION OF THE PREFERRED EMBODIMENT

Figure 1:
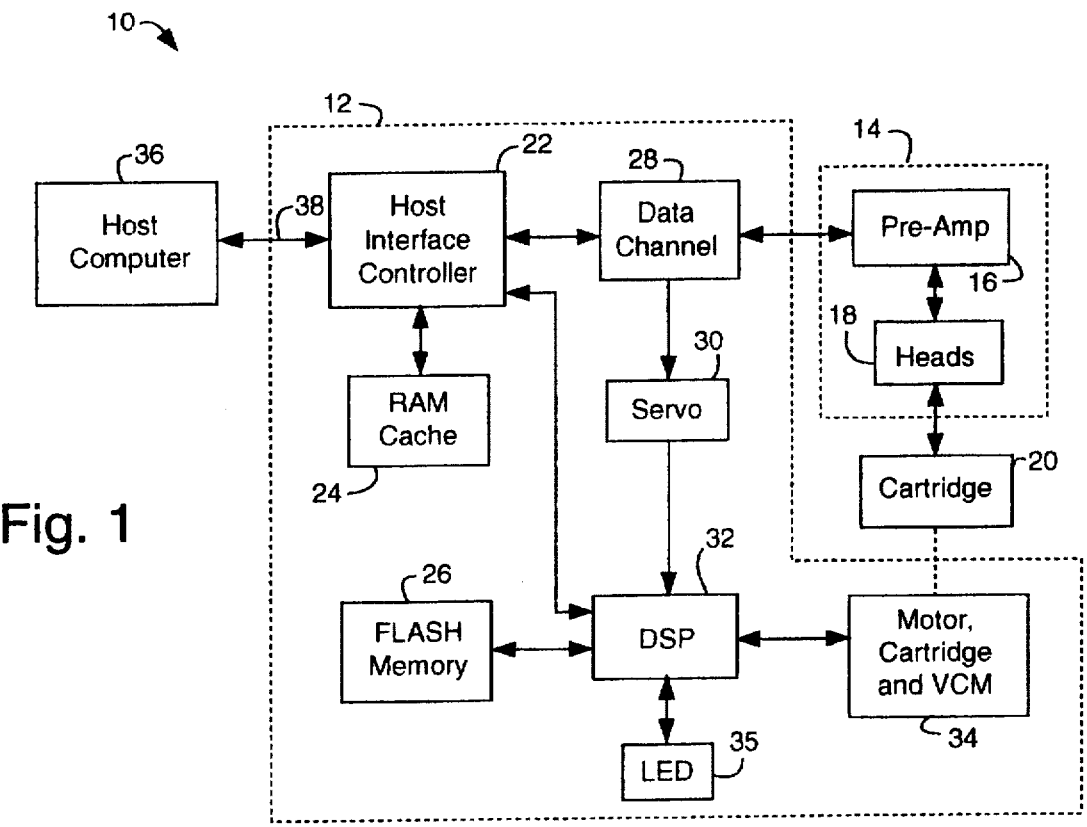
FIG. 1 is a block diagram of a hard disk system embodiment of the present invention.

FIG. 1 illustrates a system embodiment of the present invention, referred to herein by the general reference numeral 10. The system 10 includes a circuit board 12 connected to a head disk assembly (HDA) 14 that comprises a pre-amp 16 and a set of magnetic read/write heads 18 for reading, writing and formatting a removable hard disk cartridge 20. The circuit board 12 comprises a host interface controller 22 connected to a random access memory (RAM) cache 24. A FLASH memory 26 provides for the non-volatile storage of embedded control firmware. A data channel 28 connects the SCSI controller 22 to the HDA 14 and a servo controller 30. A digital signal processor (DSP) 32 connects to the servo controller 30 and can receive upload software through the data channel 28 and HDA 14 from a special maintenance track on the cartridge 20. Such upload software is storable as alternative embedded-control firmware in the FLASH memory 26. A spindle motor, voice coil motor (VCM) actuator and cartridge mechanism 34 is controlled by the DSP 32. A light-emitting diode display (LED) 35 provides user messages from the DSP 32. A host computer 36 is connected via a host interface input/output (I/O) cable 38.

Any one of several industry standard or proprietary interfaces can be used between the host 36 and the host interface controller 22, for example "IDE" or "Centronics", and that interface may be further modified to enhance certain performance attributes.

Figure 2:
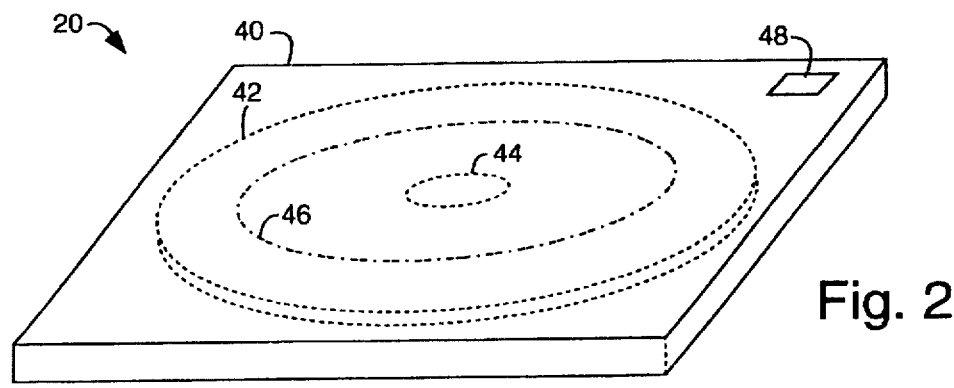
FIG. 2 is a perspective view of a removable disk cartridge used in the system of FIG. 1.

FIG. 2 shows that the cartridge 20 is comprised of a sleeve 40 within which is disposed a magnetic platter 42 with a spindle hub 44 and a maintenance track 46 of data recorded with a "special function byte" and an alternative control program for uploading in the FLASH memory 26. The mechanical construction and composition of the cartridge 20 use conventional techniques and materials well-known to artisans. For example, the cartridge 20 resembles the removable hard disk cartridges marketed by SyQuest Technologies, Inc. (Fremont, Calif.), in 44 MB, 88 MB, 200 MB size 5.25" formats and 107 MB and 270 MB size 3.5" formats. A condition code 48 is embedded in the cartridge 20 to indicate to the HDA 14 that this cartridge is a special type having the maintenance track 46. For example, the condition code 48 may be embedded in the data of the maintenance track 46 or in the shape of the sleeve 40.

In a preferred embodiment of the present invention, the cartridge 20 with the special maintenance track 46 cannot be used for ordinary data storage and the maintenance track 46 is not includable in an ordinary data storage cartridge. Such a special cartridge 20 thereby acts as a key to the programming of the embedded control program of the drive circuit board 12. Furthermore, it is preferred that the uploadable alternative control program in the maintenance track be of a different revision level to that already loaded in the FLASH memory 26, otherwise, uploading of such alternative program is not allowed.

In another embodiment, the uploadable alternative control code is included on the special maintenance track of a cartridge which can be used for ordinary data storage. Also, it may be that the alternative control code is required in order to properly read and write the data on that cartridge.

Figure 3A:
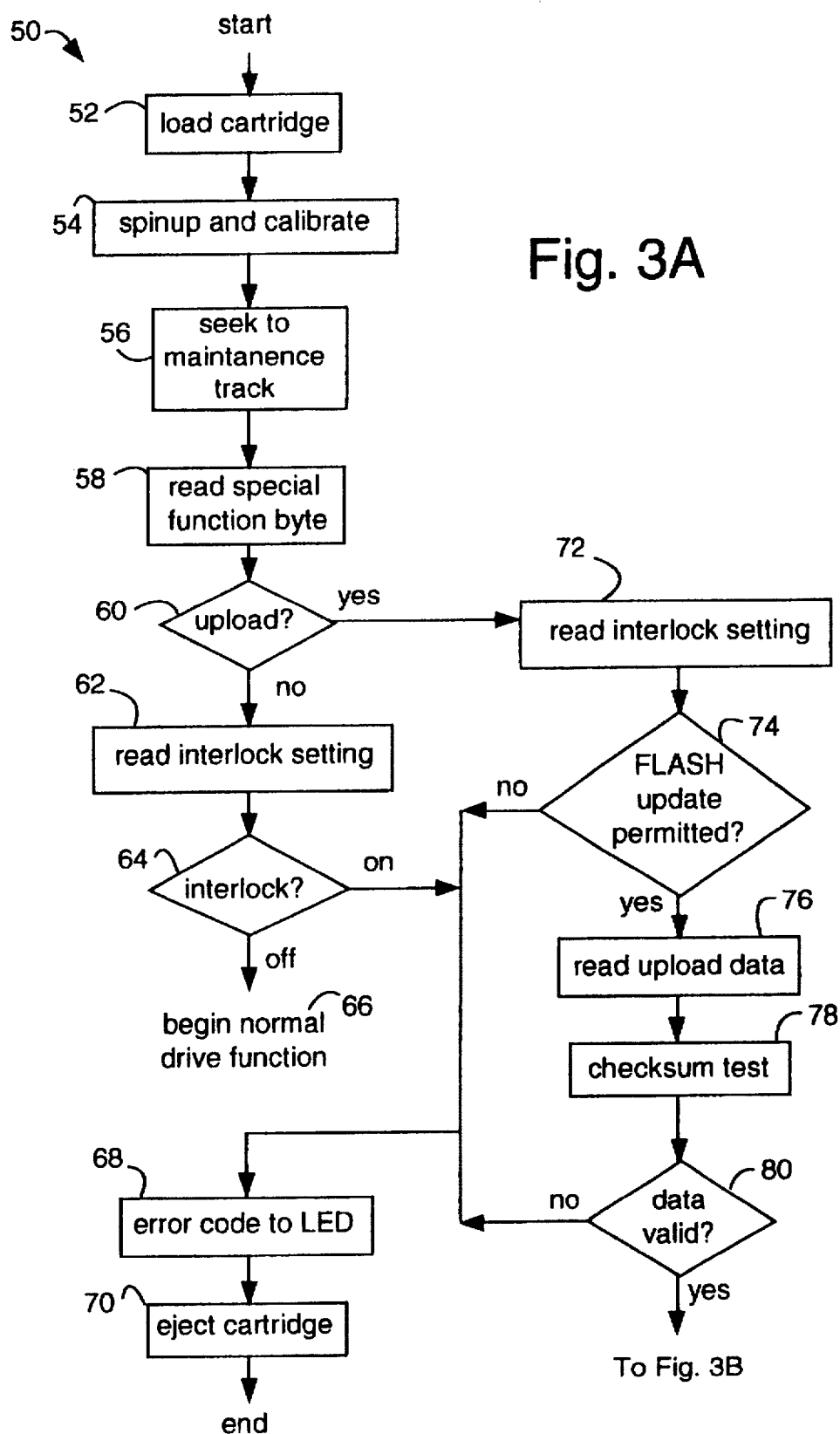
FIG. 3A is a flow chart of a control program included in the disk drive of FIG. 1 to manage the uploading of alternative control programs for the disk drive from the removable cartridge.

FIGS. 3A and 3B illustrate a computer-implemented process 50 that is included in the control firmware stored in the FLASH memory 26. This process is for the prefered embodiment of the present invention referred to above. A step 52 detects the insertion of the cartridge 20 in the HDA 14 and mechanism 34. A step 54 spins up the spindle motor, loads the heads 18 and executes a calibration sequence for the cartridge 20. A step 56 causes the VCM actuator in the mechanism 34 to seek to the maintenance track 46. A step 58 reads the "special function byte" from the data of the maintenance track 46. A step 60 determines if the special function byte indicates that the cartridge 20 is a special type that has an alternative control program to be loaded in the FLASH memory 26. If not, a step 62 reads a user interlock setting, e.g., a hardwire jumper setting or a control code sent from the host 36 over the SCSI cable 38. A step 64 determines if the interlock setting is "off". If yes, conventional drive function is commenced, e.g., using a default embedded control program in the FLASH memory 26 to operate the DSP 32. If the interlock setting is "on", then a step 68 displays an error code on the LED 35, and a step 70 causes the mechanism 34 to eject the cartridge 20. The system 10 then waits for a new cartridge 20. If the step 60 determines that the cartridge 20 is an upload type cartridge, then a step 72 reads the interlock setting. A step 74 checks to see if an update of the FLASH memory 26 is permitted. If so, a step 76 reads the upload data from the maintenance track into the RAM cache 24. A step 78 runs a checksum test of the upload data in the cache 24. A step 80 determines if the data uploaded and in the cache is valid for programming the FLASH memory 26. If not, control passes to the step 68.

Other embodiments are possible where alternative control programs are resident on a normal data cartridge and are uploaded dependent on the states of the special function byte and interlock. In these circumstances the cartridge would not be ejected.

The FLASH memory 26 can have one or more whole control programs that define the drive parameters and host interface to be used. In the case of two or more resident control programs, the FLASH memory 26 is appropriately partitioned and great caution is exercised in reprogramming any code that the DSP 32 is simultaneously executing from. For example, before reprogramming, several copies of the program-to-be-replaced are copied to the RAM cache 24 and compared. At least one default program preferably is permanently kept resident to provide a fall-back, or fail-safe, mode. Given the exact nature of the data in the maintenance track 46, application-specific operation may be toggled from between the various alternative control programs. In an alternative embodiment where two alternative control programs are already resident in the FLASH memory 26, the host 36 is allowed to write a control character to the host controller 22 to select a particular control program to be used. Furthermore, application-specific programs (ASPs) can be loaded from the maintenance track 46 that add to or replace older ASPs.

In FIG. 3B, if the data is valid, a step 82 makes a backup copy of what was in the FLASH memory 26 to the RAM cache 24. A step 84 calculates the checksum byte of the backup code and stores the checksum byte in the RAM cache 24. A step 86 determines the address in FLASH memory 26 to begin programming and the block length. A step 88 programs the FLASH memory 26 with the contents of the RAM cache 24. A step 90 checks to see if the FLASH memory 26 is programmed correctly. If not, a step 92 resets the programming pointers to restore the original data copied from the FLASH to RAM. A step 94 restores the original data to the FLASH memory 26. A step 96 tests to see if the FLASH memory 26 was programmed correctly. If not, control passes back up to step 94. If programming was correct, a step 98 causes an error code to be displayed on the LED 35. If the step 90 determines that the FLASH memory 26 is programmed correctly, it and the step 98 both can call a step 100 that causes the mechanism 34 to eject the cartridge 20.

For each interface there would necessarily be a different electronic circuit board with a different design of host controller device. It is not practical for a device to support more than one type of interface. What we can do with the code upload is to enhance or modify some feature of how we use a specific interface. For example, the drive could modify its use of the SCSI bus to emulate a tape drive and support tape drive command options.

Although the present invention has been described in terms of the presently preferred embodiment, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:
1. A removable disk drive system, comprising:
   a removable hard disk cartridge that includes a shell within which is disposed a magnetic platter with a spindle hub and a maintenance track of data;
   a disk drive that includes a set of magnetic read/write heads that provide for reading, writing and formatting the removable head disk cartridge via a data channel and a host interface controller, and that further includes a spindle motor, a voice coil motor (VCM) actuator and a cartridge loading mechanism that provide for access of said read/write heads to said magnetic platter and said maintenance track of data; and a control processor connected to execute a first-revision-level embedded non-volatile control firmware program from a rewritable permanent memory, said processor and control firmware capable of exchange of information to insure proper operation of said host interface controller, said spindle motor, said voice coil motor (VCM) actuator and said cartridge mechanism with connection of said control processor allowing the disk drive to upload software to said rewritable memory via said data channel and said read/write heads from said maintenance track of data;

wherein, the removable disk cartridge includes an embedded condition code that indicates said maintenance track of data is present and contains a second-revision-level embedded non-volatile control firmware program; and wherein, said maintenance track with said second-revision-level embedded non-volatile control firmware program includes at least one special function byte allowing upload of said embedded control firmware into the disk drive.

2. The system of claim 1, wherein:

said first-revision-level embedded non-volatile control firmware program includes a computer-implemented process that detects an insertion of the removable disk cartridge in the disk drive, that spins up said spindle motor, that loads said read/write heads, that executes a calibration sequence for the removable disk cartridge, that causes said VCM actuator to seek said maintenance track, that reads said special function byte, that determines if the special function byte indicates that the removable hard disk cartridge includes said second-revision-level embedded non-volatile control firmware program, that checks to see if an update of said rewritable permanent memory is permitted, that reads said second-revision-level embedded non-volatile control firmware program into a RAM cache, that runs a checksum test, and that transfers said second-revision-level embedded non-volatile control firmware program to said rewritable permanent memory and replaces said first-revision-level embedded non-volatile control firmware program.

3. The system of claim 1, wherein:

said rewritable permanent memory includes at least one whole control program that defines a set of drive parameters and a type of host interface to be used.

4. The system of claim 1, wherein:

said rewritable permanent memory includes at least two resident control programs and is partitioned for simultaneous program execution;

wherein, several copies of a program-to-be-replaced are copied to a RAM cache and compared and at least one default program is permanently kept resident to provide a fall-back/fail-safe, mode.

5. The system of claim 1, wherein:

wherein two alternative control programs are resident in said rewritable permanent memory and may be toggled between the control processor according to a control character written to said host controller; and wherein, a plurality of application-specific programs (ASPs) can be loaded from said maintenance track that can add to or replace an older set of ASPs.

* * * * *